US 11,461,765 B2

(12) United States Patent
Novis

(10) Patent No.: US 11,461,765 B2
(45) Date of Patent: *Oct. 4, 2022

(54) SYSTEMS AND METHODS FOR MULTI-USE ACCOUNT SYSTEM

(71) Applicant: Capital One Services, LLC, McLean, VA (US)

(72) Inventor: Austen Novis, Arlington, VA (US)

(73) Assignee: Capital One Services LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/809,488

(22) Filed: Mar. 4, 2020

(65) Prior Publication Data

US 2020/0202330 A1 Jun. 25, 2020

Related U.S. Application Data

(63) Continuation of application No. 16/116,294, filed on Aug. 29, 2018, now Pat. No. 10,614,451.

(51) Int. Cl.
*G06Q 20/34* (2012.01)
*G06Q 20/32* (2012.01)
*G06N 20/00* (2019.01)

(52) U.S. Cl.
CPC ......... *G06Q 20/3572* (2013.01); *G06N 20/00* (2019.01); *G06Q 20/322* (2013.01); *G06Q 20/341* (2013.01)

(58) Field of Classification Search
CPC .. G06Q 20/00; G06Q 20/322; G06Q 20/3572; G06Q 20/341

USPC ......................................................... 705/41
See application file for complete search history.

(56) References Cited

U.S. PATENT DOCUMENTS

| | | | |
|---|---|---|---|
| 2006/0248007 A1* | 11/2006 | Hofer ..................... | G06Q 40/12 705/40 |
| 2014/0136353 A1* | 5/2014 | Goldman ............. | G06Q 20/227 705/16 |
| 2015/0120429 A1* | 4/2015 | Salmon ................ | G06Q 20/387 705/14.33 |
| 2017/0039568 A1 | 2/2017 | Tunnell et al. | |

* cited by examiner

*Primary Examiner* — Edward Chang
(74) *Attorney, Agent, or Firm* — Finnegan, Henderson, Farabow, Garrett & Dunner, LLP

(57) ABSTRACT

The present disclosure relates to an account system for optimizing transactions for a user. In one implementation, the system may include at least one processor and a storage medium storing instructions that, when executed, configure the at least one processor to perform operations. The operations may include receiving, from the merchant system, merchant information for the transaction, retrieving, based on the account number, a database record from a database, the database record comprising the plurality of financial accounts associated with the user and user preferences, determining financial account data associated with each of the plurality of financial accounts, determining, using an optimization algorithm, a preferred financial account from the plurality of financial accounts based on the financial account data, the user preferences, and the merchant information, and selecting, based on the determination, the preferred financial account to complete the transaction.

18 Claims, 8 Drawing Sheets

SYSTEMS AND METHODS FOR MULTI-USE ACCOUNT SYSTEM

CROSS-REFERENCE TO RELATED APPLICATIONS

This application is a continuation of U.S. application Ser. No. 16/116,294, filed Aug. 29, 2018 (currently pending). The contents of the above-referenced applications are hereby incorporated in its entirety.

TECHNICAL FIELD

This disclosure relates generally to the field of a multi-use account system. More specifically, and without limitation, this disclosure relates to systems and methods for optimizing financial transactions using a multi-use account system.

BACKGROUND

Devices such as credit cards, debit cards, prepaid cards, and stored value devices are typically used to pay for goods and services. Many of these devices provide access to rewards programs or other benefits to incentivize spending. For example, a particular credit card may be tied to a rewards program that provides airlines miles based on user expenditures, such that a user may earn a mile for each dollar spent. The user can then redeem accumulated miles to purchase a flight or hotel. Another credit card may provide a certain percentage of expenditures as a cash-back reward. For example, a user may receive five percent of total expenditures on a credit card as a cash-back reward at the end of the year. Other credit cards may provide specific benefits, such as price protection for purchases or travel insurance, or low interest rates and fees. Each of these reward programs and incentives is typically tied to a single and separate financial account.

Many users apply for and use multiple credit cards to take advantage of these specific reward programs and incentives in an effort to maximize their rewards based on the type of transaction or activity they conduct. For example, a user may have a first credit card that provides the best rewards when travelling, a second credit card that provides the best rewards when dining, a third credit card that provides travel insurance, and a fourth credit card that provides a low annual percentage rate. The user must physically carry all these cards and decide which to use depending on the particular transaction or activity, and manually keep track of expenditures and rewards for each separate account. Moreover, if making transactions online, the user must remember and provide the account information for multiple different accounts, creating a security risk with respect to sensitive account information.

Also, the user must apply for a new credit card each time a better reward is available. A need therefore exists for systems and methods of providing improved multi-use account systems for optimizing financial transactions.

The disclosed system and methods for optimizing financial transactions using a multi-use account system address the existing problems set forth above, as well as other deficiencies in the prior art.

SUMMARY

Embodiments of the present disclosure use systems and methods for optimizing financial transactions of a user by using a multi-use account system associated with a plurality of financial accounts belonging to a user. The multi-use account system enables secure registration and authentication of multiple financial accounts associated with the user, and further enables an optimized selection of a particular financial account during a transaction. In this manner, the disclosed embodiments can provide a marked improvement over the subjective, manual, and multi-step processes known in the prior art.

According to some embodiments of the present disclosure, the multi-use account system comprises a virtual or physical multi-use account card for a user. A single account number and, optionally, other account information (such as a name of the account holder, an expiration date, and/or a security code) may be visible on the physical multi-account account card or displayed with the virtual multi-account account card. In certain embodiments, the account number may not be visible and/or readable to the user. The account number links the user's multi-use account card to a single database containing records associated with multiple financial accounts for the user. When using the multi-account card during a transaction (e.g., when the user provides the account number visible on the multi-account card, when a card-reading device obtains the account number from the multi-account card, or when a merchant system otherwise receives the account number), the system determines a selection of one of the financial accounts to complete the transaction. The multi-use account system improves over prior art systems by providing a single database for storing records associated with multiple accounts from disparate providers and/or systems. The consolidated and streamlined account system of the present disclosure increases the efficiency of the financial account system and provides a specific improvement to the way the account system operates, enabling the retrieval and analysis of pertinent financial account data and the selection of an optimized financial account during the performance of the transaction.

According to some embodiments of the present disclosure, the multi-use account system comprises a user interface for enabling improved control over a financial account. For example, the user interface enables a user to add, remove, or temporarily disable specific financial accounts for access and use by the multi-use account system. Further, the user interface enables control for additional users, providing limited (or full) access to the multi-use account. The disclosed system's improved control via the user interface allows users to more efficiently and accurately select optimized financial accounts for suitable transactions.

One embodiment of the present disclosure is directed to an account system for optimizing transactions for a user, the system comprising at least one processor and a storage medium storing instructions that, when executed, configure the at least one processor to perform operations. The operations include receiving card information during a transaction at a merchant system, wherein the card information includes a single account number associated with a plurality of financial accounts associated with the user, receiving, from the merchant system, merchant information for the transaction, retrieving, based on the account number, a database record from a database, the database record comprising the plurality of financial accounts associated with the user and user preferences, determining financial account data associated with each of the plurality of financial accounts, determining, using an optimization algorithm, a preferred financial account from the plurality of financial accounts based on the financial account data, the user preferences, and the merchant information, and selecting, based on the determination, the preferred financial account to complete the transaction.

Another embodiment of the present disclosure is directed to a computer-implemented method for optimizing transactions for a user, the method comprising receiving card information and merchant information during a transaction, wherein the card information includes a single account number associated with a plurality of financial accounts associated with the user, retrieving, based on the account number, a database record from a database, the database record comprising the plurality of financial accounts associated with the user and user preferences, determining financial account data associated with each of the plurality of financial accounts, retrieving, from the database, a user behavior metric associated with the user, wherein the user behavior metric is calculated based on user transaction history relating to the plurality of financial accounts, determining, using an optimization algorithm, a preferred financial account from the plurality of financial accounts based on the user preferences, the financial account data, the merchant information, and the user behavior metric, and selecting, based on the determination, the preferred financial account to complete the transaction.

A further embodiment of the present disclosure is directed to a non-transitory computer-readable medium storing instructions that, when executed by at least one processor, cause the at least one processor to operate an account system for optimizing transactions for a user, comprising receiving card information associated during a transaction at a merchant system, wherein the card information includes a single account number associated with a plurality of financial accounts associated with the user, receiving, from the merchant system, merchant information for the transaction, the merchant information comprising a transaction category associated with the transaction, retrieving, based on the account number, a database record from a database, the database record comprising financial account data for the plurality of financial accounts associated with the user and user preferences, wherein each of the plurality of financial accounts is associated with a rewards program, determining the financial account data associated with each of the plurality of financial accounts, wherein the financial account data comprises accumulated points in the associated rewards program and rules for the associated rewards program, determining, using an optimization algorithm, a preferred financial account from the plurality of financial accounts based on the user preferences, the financial account data, and the merchant information, selecting, based on the determination, the preferred financial account to complete the transaction, and storing, in the rewards program associated with the selected financial account, points accumulated based on the transaction.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DESCRIPTION OF EMBODIMENTS

The disclosed embodiments relate to systems and methods for optimizing financial transactions of a user by using a multi-use account system associated with a plurality of financial accounts belonging to a user. Reference will now be made in detail to exemplary embodiments and aspects of the present disclosure, examples of which are illustrated in the accompanying drawings. While numerous specific details are set forth in order to provide a thorough understanding of the disclosed example embodiments, it would be understood by those skilled in the art that the principles of the example embodiments may be practiced without every specific detail. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings.

Embodiments of the present disclosure may be implemented using a general-purpose computer. Alternatively, a special-purpose computer may be built consistent with embodiments of the present disclosure using suitable circuit elements.

Figure 1:
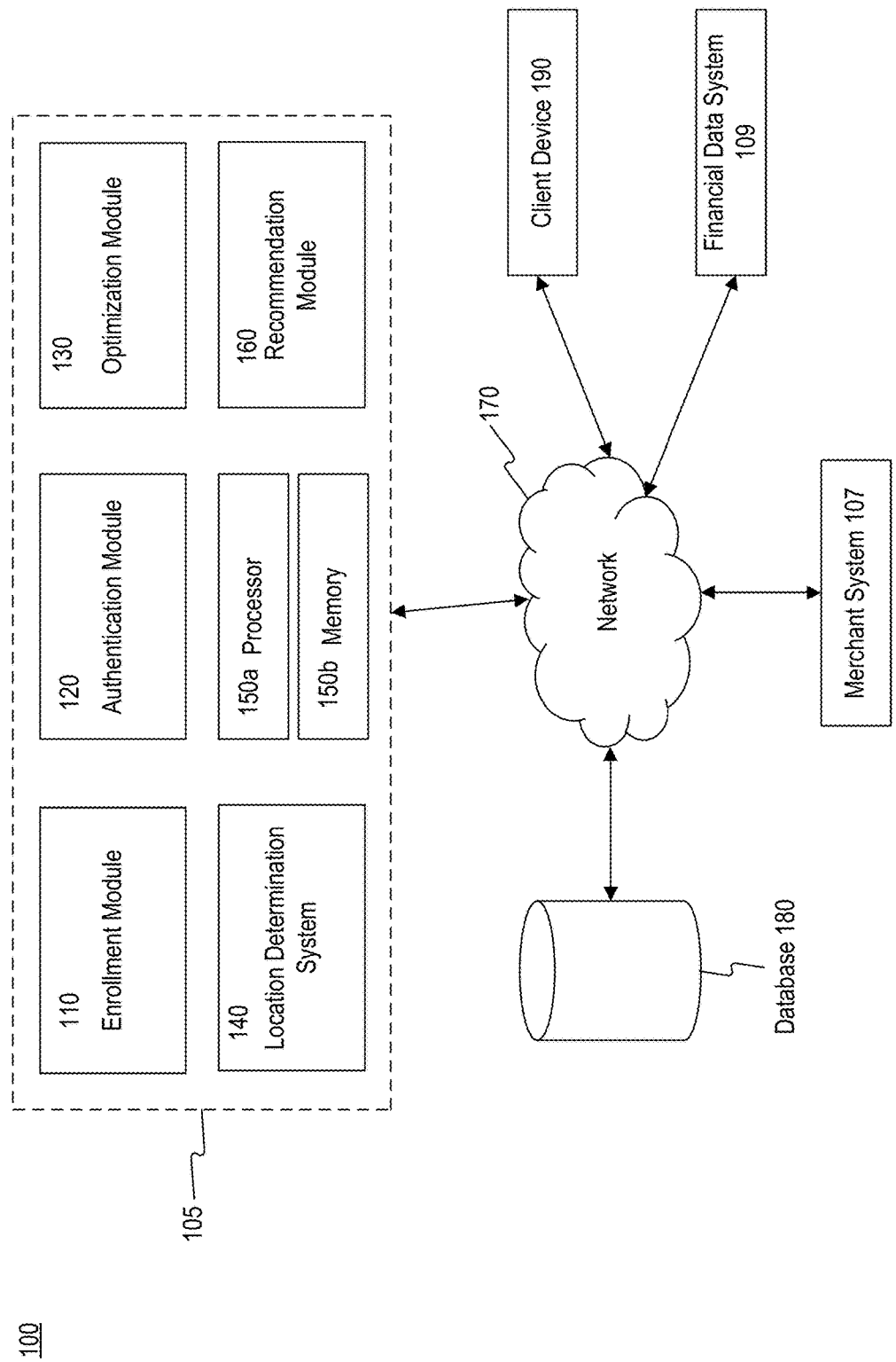
FIG. 1 is a block diagram of an exemplary system, consistent with disclosed embodiments.

FIG. 1 is a block diagram of an exemplary system 100. System 100 may be used to optimize financial transactions through a user's multi-use account associated with a plurality of financial accounts belonging to a user, consistent with disclosed embodiments. System 100 may include a server system 105 which may include an enrollment module 110, an authentication module 120, an optimization module 130, a location determination system 140, a processor 150*a*, a memory 150*b*, and a recommendation module 160. System 100 may additionally include a database 180, a client device 190, and a merchant system 107. In some embodiments, as shown in FIG. 1, each component of system 100 may be connected to a network 170. However, in other embodiments components of system 100 may be connected directly with each other, without network 170.

Processor 150*a* may include one or more processors, microprocessors, central processing units (CPUs), computing devices, microcontrollers, digital signal processors, servers, or any combination thereof. Memory 150*b* may include one or more storage devices configured to store data which may be read by a processor, computer, or like device.

Memory 150*b* may include volatile or non-volatile, magnetic, semiconductor, tape, optical, removable, non-removable, or other types of computer-readable medium or computer-readable storage devices, For example, memory 160 may include random-access memory (RAM), such as static RAM (SRAM) or dynamic RAM (DRAM), ROM, magnetic or optical storage medium, flash memory devices, electrical, optical, acoustical or other form of propagated signals (e.g., carrier waves, infrared signals, digital signals).

Database 180 may include one or more computing devices configured to store and/or provide user information associated with an account to one or more of server system 105, enrollment module 110, authentication module 120, optimization module 130, location determination system 140, memory 150*b*, recommendation module 160, and client device 190. In some aspects, such user information can include financial account data for one or more user financial accounts, user preferences, user account information, and stored information related to the user financial accounts. In some aspects, user account information may include user profile information, such as user identifier, username, account number, login credentials, device identifier, address, passcode, or other such information. In some aspects, database 180 may include user information needed for the processes described below in connection with FIGS. 5-8. In some aspects, database 180 includes authentication or security information relating to one or more of the user financial accounts, such as login credentials, unique identifiers, security codes, addresses, passcodes, EMV chip information, or other such information. In some aspects, database 180 may include location information obtained from location determination system 140. A "module" may be a device implemented in hardware, software, firmware, or any combination thereof.

Database 180 may include, for example, one or more Oracle™ databases, Sybase™ databases, or other relational databases or non-relational databases, such as Hadoop™ sequence files, HBase™, or Cassandra™ Database(s) 180 may include computing components (e.g., database management system, database server, etc.) configured to receive and process requests for data stored in memory devices of the database(s) and to provide data from the database(s).

While database 180 is shown separately, in some embodiments database 180 may be included in or otherwise related to one or more of server system 105, enrollment module 110, authentication module 120, optimization module 130, memory 150*b*, recommendation module 160, and client device 190.

Database 180 may be configured to collect, store, and/or maintain user information from merchant system 107, server system 105, and/or client device 190. Database 180 may collect user information from a variety of other sources, including, for example, financial data system(s) 109. Database 180 is further described below in connection with FIG. 3.

Client device 190 may include one or more computing devices configured to perform operations consistent with disclosed embodiments. For example, client device 190 may include at least one of a laptop, a tablet, a smart phone, a gaming device, a wearable computing device, or other type of computing device. Client device 190 may include one or more processors configured to execute software instructions stored in memory, such as memory included in client device 190. Client device 190 may include software that when executed by a processor performs Internet-related communication and content display processes. For instance, client device 190 may execute browser software that generates and displays interfaces including content on a display device included in, or connected to, client device 190. Client device 190 may execute applications that allow client device 190 to communicate with components over network 170, and generate and display content in interfaces via a display device included in client device 190.

The disclosed embodiments are not limited to any particular configuration of client device 190. For instance, client device 190 can be a device that stores and executes mobile applications that interact with server system 105 and/or database 180 to perform aspects of the disclosed embodiments. In certain embodiments, client device 190 may be configured to execute software instructions relating to location services, such as GPS locations. For example, client device 190 may be configured to determine a geographic location and provide location data and time stamp data corresponding to the location data. In yet other embodiments, client device 190 may capture images. Client device 190 is further described below in connection with FIG. 2.

Enrollment module 110 may include one or more computing components configured to register a user for a multi-use account and/or enable a user of a multi-use account to add new or existing financial accounts to the multi-use account. Enrollment module 110 may be configured to receive and process user information from merchant system 107, financial data system 109, client device 190 and/or database 180. Consistent with disclosed embodiments, the user information may include financial account data relating to one or more user financial accounts and user preferences. In some embodiments, enrollment module 110 can be configured to communicate with authentication module 120, optimization module 130, location determination system 140, recommendation module 160, client device 190, merchant system 107, and financial data system 109 to carry out the registration steps. In some embodiments, enrollment module 110 may be implemented on client device 190.

Authentication module 120 may include one or more computing components configured to perform operations consistent with authentication, including authenticating a user or authenticating a financial transaction. In some embodiments, a user registers for a multi-use account through enrollment module 110. During enrollment, user information may be generated and stored in memory 150*b*, database 180, and/or client device 190, for example. User information can include financial account data for one or more user financial accounts, user preferences, user account information, and stored information related to the user financial accounts. To authenticate the multi-use account user, an enrolled user can provide user account information to the authentication module 120 via client device 190, for example. Consistent with disclosed embodiments, the user account information may include user profile information, such as user identifier, username, account number, login credentials, device identifier, address, passcode, user biometric information (e.g. fingerprint, voice print, retinal scan, or facial image for the user), or other such information. Authentication module 120 can be configured to authenticate the user based on a comparison of the user account information provided by the user with previously stored user account information. In some embodiments, authentication module 120 can grant access to the user's multi-use account based on the authentication.

In some embodiments, authentication module 120 authenticates a user of a multi-use account system during a transaction using the multi-use account. In some embodiments, authentication module 120 communicates with enrollment module 110 and financial data system 109 to authenticate a user when a new or existing account is added to the multi-use account. In some embodiments, authentication module 120 can be configured to communicate with enrollment module 110, optimization module 130, location determination system 140, recommendation module 160, database 180, merchant system 107, financial data system 109, and client device 190 to carry out the authentication steps. In some embodiments, authentication module 120 may be implemented on client device 190.

In some embodiments, authentication module 120 enables authentication of the financial transaction using security or authentication information associated with the financial account selected to compete the transaction. In some embodiments, authentication module 120 communicates with database 180 to retrieve security information associated with the selected financial account, such as a security code, a passcode, a PIN number, smart chip or EMV data, an account name, an expiration date, or other such information. When the selected financial account is used to complete the transaction, an authentication request may be sent to server system 105, which may generate a tokenized response to the request. In some embodiments, authentication module 120 can be configured to communicate with enrollment module 110, optimization module 130, location determination system 140, recommendation module 160, database 180, merchant system 107, financial data system 109, and client device 190 to carry out the authentication steps and/or generate a token in response to an authentication request.

Optimization module 130 may include one or more computing components configured to provide an optimal selection of a financial account in a user's multi-use account to complete a transaction at a merchant. Optimization module 130 may communicate with enrollment module 110, authentication module 120, location determination system 140, recommendation module 160, database 180, merchant system 107, financial data system 109 and client device 190 to enable the optimization process consistent with disclosed embodiments. For example, optimization module 130 may retrieve user information associated with a user's multi-use account during a transaction associated with merchant system 107. The user information may include financial account data for one or more user financial accounts associated with the user's multi-use account. The user information may also include user preferences relating to the user's multi-use account. Optimization module 130 may also determine transaction information based on information received from merchant system 107 and/or client device 190. Based on the user information and transaction information, for example, optimization module 130 may use an algorithm to determine which financial account, among multiple financial accounts associated with the user's multi-use account, should be used to complete the transaction. For example, the optimization module 130 may determine that a transaction qualifies for certain types of rewards available from a first financial account associated with the user's multi-use account, and select the first financial account to complete the transaction to maximize the type of rewards the user may accumulate. As another example, optimization module 130 may determine that a transaction qualifies for a reward based on a determination of the user's location. For example, a user's location indicating that the user is located at a gas station may enable selection of a financial account that provides points for "gas" purchases. As another example, a user's location indicating that the user is in a certain geographic location may enable selection of a financial account that provides points for purchases made within that geographic location (e.g., as a part of a "buy local" rewards program).

In some embodiments, optimization module 130 may calculate a user behavior metric associated with the multi-use account. In some embodiments, the user behavior metric indicates one or more of user spending patterns, user spending preferences, user category preferences, or user reward preferences. Optimization module 130 may communicate with enrollment module 110, authentication module 120, location determination system 140, recommendation module 160, database 180, merchant system 107, and financial data system 109 to calculate the user behavior metric consistent with disclosed embodiments. For example, optimization module 130 may retrieve user transaction history information from database 180, merchant system 107, financial data system 109, and/or client device 190. User transaction history information may include information related to financial transactions for goods and/or services associated with the user financial accounts in the multi-use account. Optimization module 130 may also retrieve information associated with user preferences from location determination system 140 and/or client device 190. Consistent with disclosed embodiments, optimization module 130 may extract features from received user transaction history information and user preferences to calculate a user behavior metric.

In some aspects, the user behavior metric is calculated using identification models. The identification models may include convolutional neural networks that determine attributes in the user information based on features extracted from the user information. In various aspects, identification models may include statistical algorithms to determine a preferred user behavior. For example, identification models may include regression models that estimate the relationships among input and output variables. In some aspects, identification models may additionally sort elements of a dataset using classifiers to determine the probability of a specific outcome. Statistical identification models may be parametric, non-parametric, and/or semi-parametric models. A convolutional neural network model can be configured to process the user information into a collection of features. The convolutional neural network can comprise an input layer, one or more middle layers, and one or more output layers. In some aspects, each middle layer and the output layer can be a deterministic function of the values of the preceding layer. The convolutional neural network can include one or more convolutional layers. Each convolutional layer can be configured to convolve one or more spatial filters with the convolutional layer input to generate a convolutional layer output tensor. In some embodiments, the convolutional neural network can also include pooling layers and fully connected layers according to methods known in the art. Identification models may also include Random Forests composed of a combination of decision tree predictors. Such decision trees may comprise a data structure mapping observations about something, in the "branch" of the tree, to conclusions about that thing's target value, in the "leaves" of the tree. Each tree may depend on the values of a random vector sampled independently and with the same distribution for all trees in the forest. Identification models may additionally or alternatively include classification and regression trees, or other types of models known to those skilled in the art.

Consistent with disclosed embodiments, the calculated user behavior metric may be used by optimization module 130 to provide an optimal selection of a financial account in a user's multi-use account to complete a transaction at a merchant. In some embodiments, optimization module 130 may provide the user behavior metric to recommendation module to enable recommendation of one or more financial accounts to the user, consistent with disclosed embodiments.

In some embodiments, optimization module 130 may utilize the user behavior metric to adjust weights of various factors associated with user preferences. In some embodiments, optimization module 130 may be implemented on client device 190.

Recommendation module 160 includes one or more computing components configured to perform operations consistent with providing a recommendation to a user. In some embodiments, recommendation module communicates with optimization module 130 and/or database 180 to provide a recommendation for a new financial account that the user of multi-use account system may apply for. For example, recommendation module 160 may recommend, based on a user behavior metric obtained from optimization module 130 or database 180, a new financial account that provides rewards for purchases involving air travel. In some embodiments, recommendation module 160 may be implemented on client device 190.

FIG. 1 shows enrollment module 110, authentication module 120, optimization module 130, and recommendation module 160 as different components. However, these modules may be implemented in the same computing system.

Location determination system 140 may include one or more computing components configured to perform operations consistent with determining a location of a client device 190 and/or merchant system 107. In some embodiments, location determination system 140 may transmit a request to client device 190 or merchant system 107 for location information. In response to the request, client device 190 or merchant system 107 may transmit location information such as geographic coordinates or identifiers to the location determination system 140 via network 170. The location determination system 140 may map the geographic coordinates or identifiers to a specific geographic location. The location determination system 140 may include satellite-based geolocation systems, e.g., GPS, Glonass, Galileo, etc.; long-range terrestrial geolocation systems, e.g., LORAN; short-range network based geolocation systems, e.g., network-based cellular e911; short-range proximity location sensing, e.g., 802.11 access point identification, line-of-sight location identification, e.g., IRdA or other visible, sonic or invisible electromagnetic waves which are confined by barriers; RFID based location detectors; and the like.

In some embodiments, location determination system 140 can be configured to communicate with enrollment module 110, authentication module 120, optimization module 130, recommendation module 160, merchant system 107, financial data system 109, and client device 190. In some embodiments, location determination system 140 may be implemented on client device 190.

Merchant system 107 may include one or more computing components configured to perform operations for initiating, processing, and/or completing a transaction. Merchant system 107 can be a computing device that is controlled and operated by a merchant that provides products (e.g., goods and/or services), such as a restaurant, retailer, hotel, airline, grocery store, service provider (e.g., utility company, insurance company, financial service provider, automobile repair services, etc.), or any other type of entity that provides goods, services, and/or information that consumers (i.e., end-users or other business entities) can purchase, consume, or use. According to some embodiments, merchant system 107 can be a mobile device (e.g., tablet, smart phone, etc.), a desktop computer, a laptop, a server or any other type of computing device. Merchant system 107 may be an e-commerce website enabling the purchase of goods and/or services. Merchant system 107 may include a point of sale (POS) terminal, which can be a dedicated POS terminal or a software application that can configure a general purpose computing device to accept financial account card payments.

Financial data system 109 may include one or more computing components associated with financial service providers. A financial services provider can be a business entity that provides financial account card to consumers such as a bank, credit card issuer, or other entity that generates, provides, manages, and/or maintains financial service accounts for one or more users. Financial data system 109 can generate, maintain, store, provide, and/or process financial data associated with one or more financial accounts. Financial data can include information about financial accounts including, but not limited to, issuing financial institution, card holder name, card holder address, account balance, available credit, existing fees, card expiration dates, account transaction data (e.g., transaction dates, transaction amounts, transaction types, location of transaction, etc.), an annual percentage rate, rewards program information, a benefit associated with the financial account (e.g., automobile insurance, price protection for purchases of goods/services, etc.), a threshold requirement or rule to fulfill a status associated with the financial account, and a threshold requirement or rule to fulfill a rewards program associated with the financial account.

In some embodiments, financial data system 109 can provide financial account data to requesting computing systems, such as server system 105, merchant system 107, and/or client device 190, for example. Financial data system 109 can expose, in some embodiments, an application programming interface (API) that provides one or more methods for obtaining account information to requesting computing systems. For example, a requesting computing system can provide financial data system 109 with a financial account number via the API, and financial data system 109 can provide the requesting computing system with the name, address, expiration date, issuing bank, or other information associated with the financial account number.

Network 170 may be any type of network configured to provide communications between components of system 100. For example, network 170 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In some embodiments, one or more components of system 100 can communicate through network 170. In various embodiments, one or more components of system 100 may communicate directly through one or more dedicated communication links.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
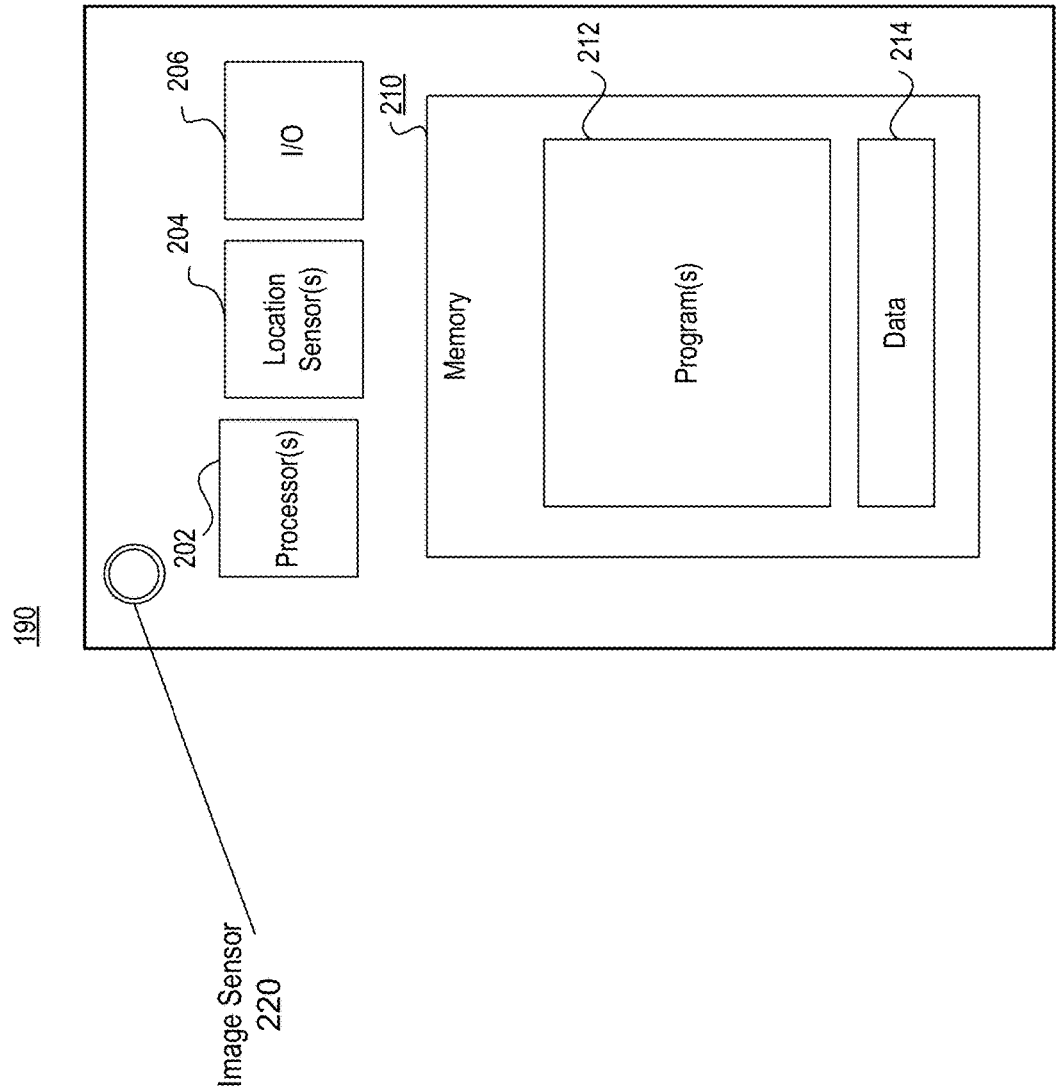
FIG. 2 is a block diagram of an exemplary user device, consistent with disclosed embodiments.

FIG. 2 is a block diagram of client device 190, consistent with disclosed embodiments. In one embodiment, client device 190 may include a processor 202, a location sensor 204, an input/output (I/O) system 206, and a memory 210.

In some embodiments, client device 190 may take the form of a mobile computing device (e.g., a wearable device, smartphone, tablet, laptop, or similar device), a desktop (or workstation or similar device), or a server. Alternatively, client device 190 may be configured as a particular apparatus, embedded system, dedicated circuit, and the like based on the storage, execution, and/or implementation of the software instructions that perform operations consistent with the disclosed embodiments. According to some embodiments, client device 190 may be configured to provide a web browser or similar computing application capable of accessing web sites, consistent with disclosed embodiments.

Processor 202 may include one or more known processing devices, such as microprocessors manufactured by Intel™, NVIDIA™, or various processors from other manufacturers. As would be appreciated by one of skill in the art, the disclosed embodiments are not limited to a particular processor type.

Memory 210 may include one or more storage devices configured to store instructions for performing operations related to disclosed embodiments. For example, memory 210 may be configured with one or more software components, such as program(s) 212, that when executed by processor 202, can cause client device 190 to perform operations consistent with the disclosed embodiments. The disclosed embodiments are not limited to separate programs or computers configured to perform dedicated tasks. For example, client device 190 can be configured to perform the disclosed functions of client device 190 by one or more programs stored in memory 210 (e.g., program 212). In some embodiments, memory 210 can be configured to store data 214 used by one or more programs 212. In some embodiments, program 212 may implement functions of one or more of enrollment module 110, authentication module 120, optimization module 130, or recommendation module 160.

Location sensor 204 may include sensor(s) and/or system(s) capable of determining a location of client device 190, such as a Global Positioning System (GPS) receiver, Bluetooth transceiver, or WiFi transceiver. When location sensor 204 includes multiple sensors and/or systems, client device 190 can be configured to determine geographic coordinates or identifiers, such as latitude or longitude, based on data provided from multiple sensor(s) and/or system(s). Client device 190 can be configured to send the geographic coordinates or identifiers determined by location sensor 204 to other components of system 100 via, for example, network 170.

I/O system 206 may include one or more devices configured to allow data to be received and/or transmitted by client device 190 and to allow client device 190 to communicate with other machines and devices, such as other components of system 100. For example, I/O system 206 may include a screen for providing information to the user. I/O system 206 may also include components for NFC communication. I/O system 206 may also include one or more digital and/or analog devices that allow a user to interact with client device 190 such as a touch-sensitive area, buttons, or microphones. I/O system 206 may also include one or more accelerometers to detect the orientation and inertia of client device 190. I/O system 206 may also include a fingerprint scanner, a retinal scanner, or other biometric sensor. I/O system 206 may also include other components known in the art for interacting with server system 105.

In some embodiments, client device 190 may include an image sensor 220 (e.g., a digital camera). Image sensor 220 can be configured to generate data representing still images or video and send it to other components of system 100 via, for example, network 170.

The components of client device 190 may be implemented in hardware, software, or a combination of both hardware and software, as will be apparent to those skilled in the art.

Figure 3:
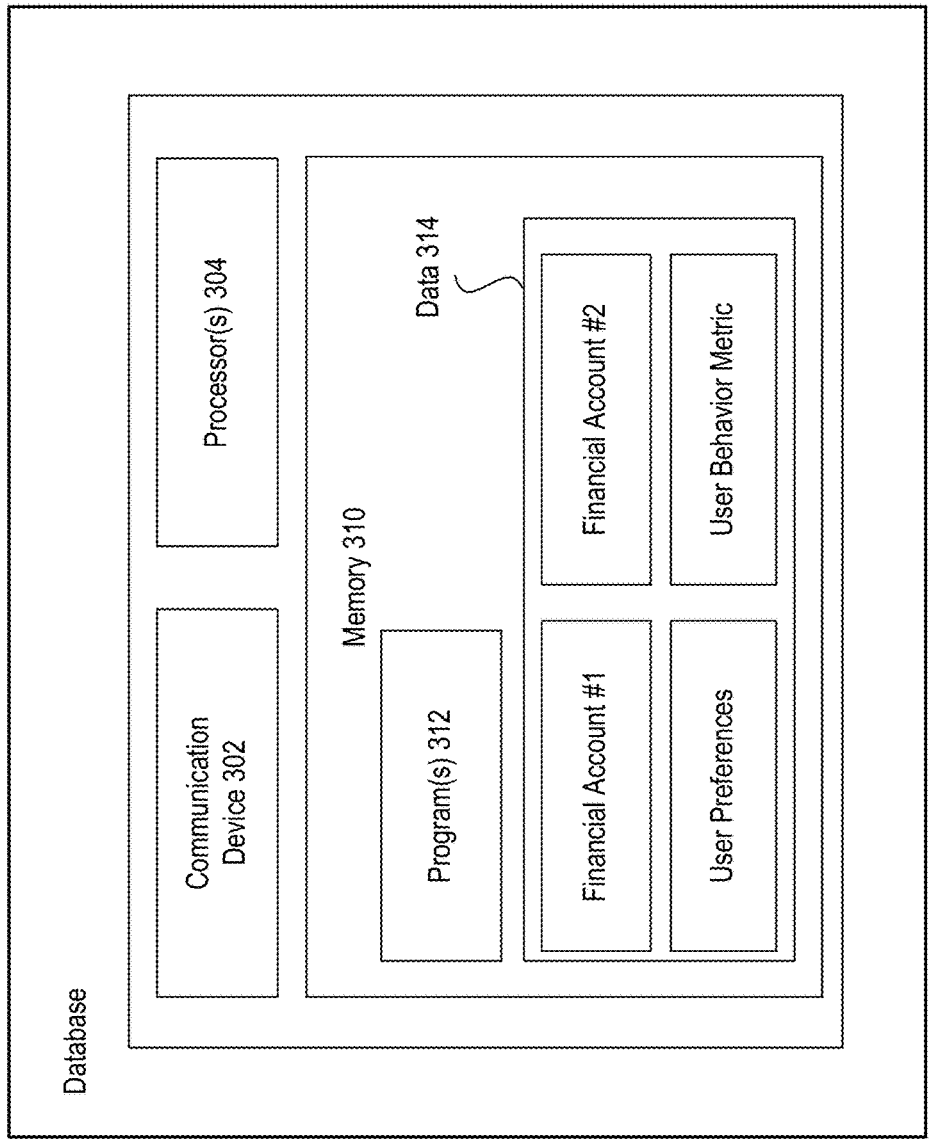
FIG. 3 is a block diagram of an exemplary database, consistent with disclosed embodiments.

FIG. 3 is a block diagram of an exemplary database 180, consistent with disclosed embodiments. Database 180 may include a communication device 302, one or more database processors 304, and database memory 310 including one or more database programs 312 and data 314.

In some embodiments, databases 180 may take the form of servers, general purpose computers, mainframe computers, or any combination of these components. Other implementations consistent with disclosed embodiments are possible as well.

Communication device 302 may be configured to communicate with one or more components of system 100, such as server system 105, enrollment module 110, authentication module 120, optimization module 130, location determination system 140, processor 150*a*, memory 150*b*, recommendation module 160, client device 190, and/or merchant system 107. In particular, communication device 302 may be configured to provide, to server system 105, user information associated with a user account and/or user financial account that may be used to determine the selection of a financial account to complete a transaction.

Database processors 304, database memory 310, database programs 312, and data 314 may take any of the forms described above for processors 202, memory 210, programs 212, and data 214, respectively. The components of databases 180 may be implemented in hardware, software, or a combination of both hardware and software, as will be apparent to those skilled in the art. For example, although one or more components of databases 180 may be implemented as computer processing instruction modules, all or a portion of the functionality of databases 180 may be implemented instead in dedicated electronics hardware.

Data 314 may be data associated with a multi-use account system for a user, and include data associated with a plurality of financial accounts belonging to the user. For example, the account number associated with the user's multi-account system may point to the records stored as data 314. Data 314 may include, for example, information related to a first financial account (e.g. Financial Account #1), a second financial account (e.g. Financial Account #2), and user preferences. For example, the information related to the first or second financial account may include one or more factors relating to rewards program information (e.g., rules for rewards acquisition and rewards redemption for the rewards program accounts), a threshold requirement or rule to fulfill a status associated with the financial account, and a threshold requirement or rule to fulfill a rewards program associated with the financial account. The information may also include credit limits, fees, annual percentage rates, and/or benefits associated with the financial account. Further, the information may include security or authentication information associated with each financial account. User preferences may include weights associated with the factors, where the weights indicate a level of importance to the user. User preferences may further include one or more of user interests, transaction category preferences, and reward accumulation goals. Data 314 may include a calculated user behavior metric.

Figure 4:
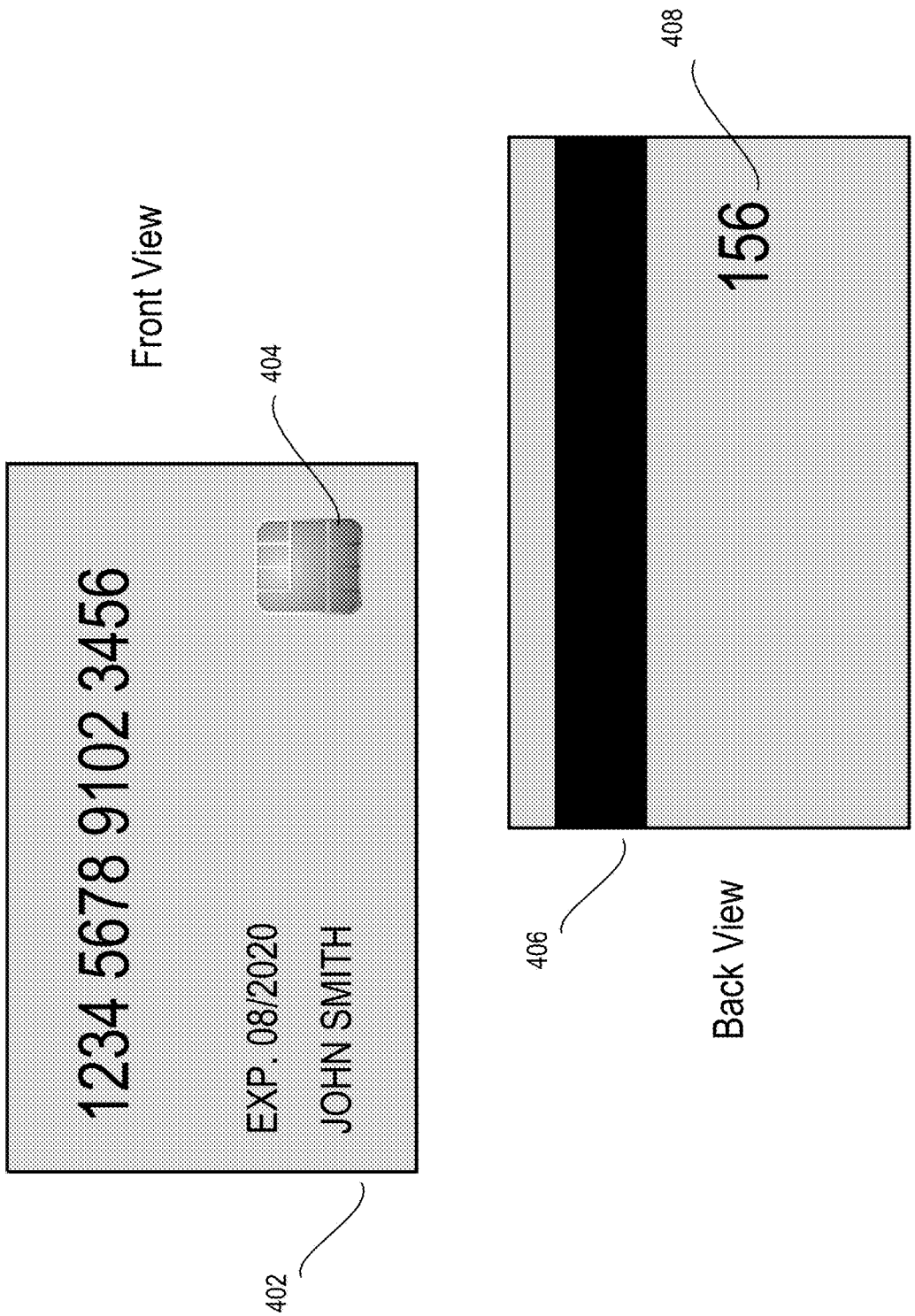
FIG. 4 is an illustration of an exemplary financial account card.

FIG. 4 is an illustration of an exemplary financial account card for use in the multi-use account system. Card 402 may be a financial account card, such as a credit card, a debit card, a smart card, an ATM card, or any other card associated with a financial account and that may be used to make purchase transactions. Card 402 includes, for example, account information such as information identifying the card holder, an account number, and expiration date. Card 402 may include a smart card chip 404 to communicate with a merchant system 107. Card 402 may also include a magnetic stripe 406 and/or a security number 408 as shown in the back view of card 402 in FIG. 4.

In some embodiments, card 402 includes a single account number for the user's multi-use account, which is associated with a database record including a plurality of financial accounts belonging to the user. In some embodiments, card 402 is a virtual card that is stored in a client device of the user, such as client device 190. In some embodiments, a user of client device 190 may manually enter the account number associated with card 402 during a transaction at a merchant, or the user may capture an image of card 402 using image sensor 220 of client device 190, and OCR capable software installed on client device 190 may extract the card data. In some embodiments, a virtual card may be stored in an electronic wallet on the client device 190. In some embodiments, card data stored on client device 190 or transmitted via client device 190 may be encrypted using encryption techniques to provide an additional layer of security.

Figure 5:
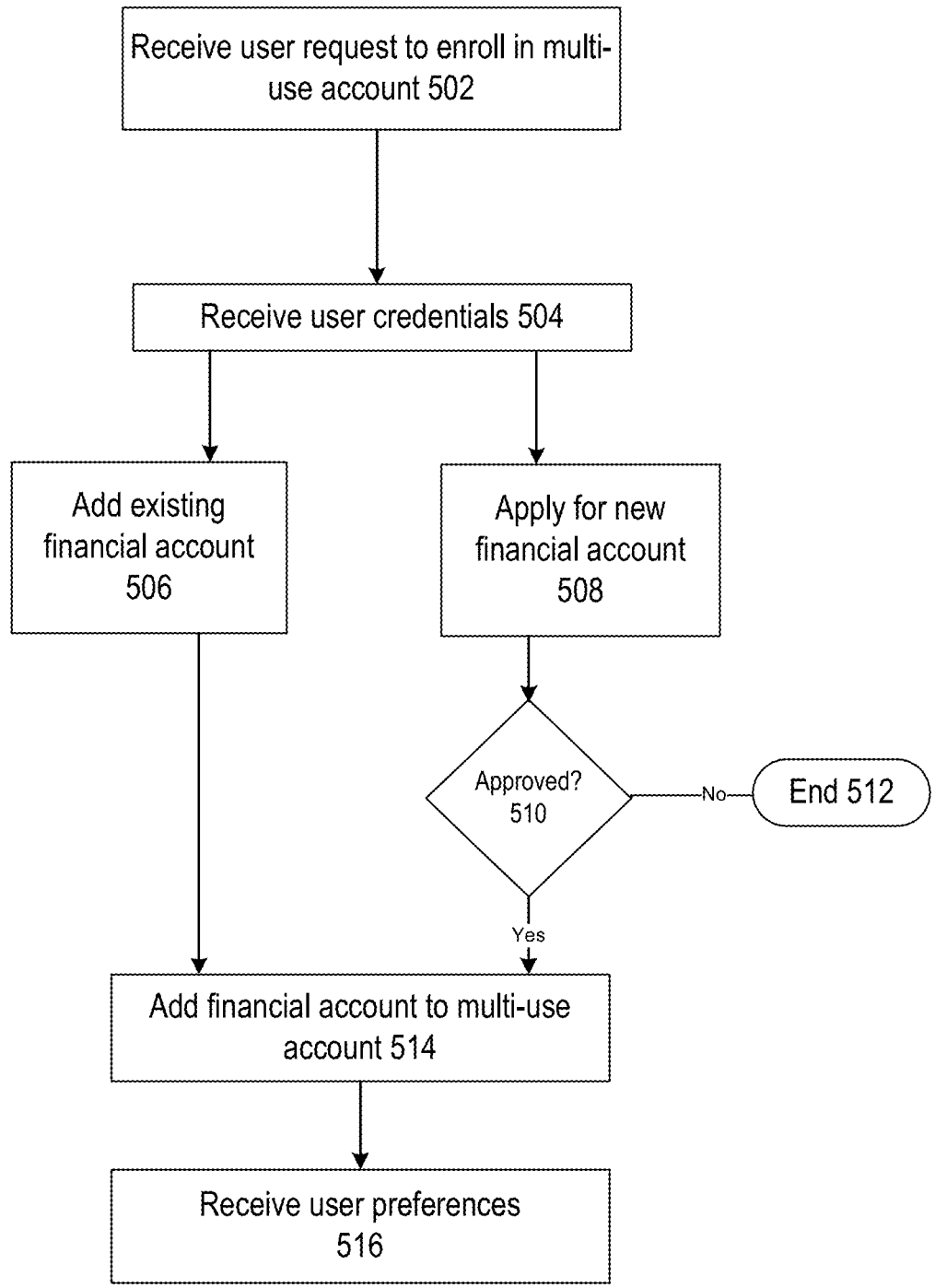
FIG. 5 is a flowchart of an exemplary method for enrolling financial accounts into the multi-use account.

FIG. 5 is a flowchart of an exemplary method for enrolling financial accounts into the multi-use account. Method 500 can be performed using system 100. In some embodiments, one or more steps of method 500 can be performed by client device 190. In various embodiments, one or more steps of method 500 can be performed by server system 105.

At step 502, server system 105 is configured to receive a request from a user to enroll in a multi-use account. In some embodiments, the request may be received by enrollment module 110 from client device 190 over network 170. For example, the user may interact with a user interface on the client device 190 to transmit the request for enrolling in a multi-use account with server system 105. In some embodiments, enrollment module 110 provides instructions to a user interface on the client device 190. For example, the user interface may instruct the user to enter user profile information and/or information relating to an existing financial account related to the user. In some embodiments, user profile information may also include a user identifier, username, account number, login credentials, device identifier, address, passcode, or other such information. User profile information may also include biometric data associated with the user, such as a fingerprint, voice print, retinal scan, or facial image for the user. For example, the user interface may instruct the user to scan a fingerprint, record a voice print, scan a retina, or capture a facial image for the user using a biometric sensor, such as biometric sensor 206 of client device 190. Enrollment module 110 may process the received information and create a multi-use account for the user. The user profile information and other information related to the multi-use account may be stored in memory 150*b*, database 180, and/or client device 190.

At step 504, server system 105 is configured to receive user credentials to authenticate the user of the multi-use account. In some embodiments, authentication module 120 provides instructions to a user interface on the client device 190 to provide user credentials for securely logging into the account. For example, the user credentials may include the user identifier, username, account number, login credentials, device identifier, address, passcode, and/or biometric data that was received by enrollment module 110 during step 502 and stored in memory 150*b*, database 180, and/or client device 190. In some embodiments, authentication module 120 can be configured to authenticate the user based on a comparison of the received user credentials with the previously stored user profile information. If there is a match, authentication module 120 can grant access to the user's multi-use account.

At step 506, server system 105 is configured to enable the user to add one or more existing financial accounts associated with the user to the multi-use account. In some embodiments, enrollment module 110 provides instructions to a user interface on the client device 190 to enter financial account data, such as a financial account number, name, address, expiration date, issuing bank, or other information associated with the financial account. The instructions to the user interface may request the user to capture an image of a card associated with the financial account, such as card 402, using image sensor 220 of client device 190. Enrollment module 110 or OCR capable software installed on client device 190 may be configured to extract the card data. In some embodiments, enrollment module 110 relays the financial account data to financial data system 109 to obtain approval of the request to add the financial account, consistent with disclosed embodiments.

At step 508, server system 105 is configured to enable the user to apply for a new financial account to associate with the multi-use account. In some embodiments, enrollment module 110 may communicate with financial data system 109 to provide the user with a list of available financial accounts that the user may prequalify for. For example, the list may be based on user information retrieved from optimization module 130 and/or database 180, such as user transaction history for one or more financial accounts, user preferences, or user profile information. In some embodiments, enrollment module 110 may communicate with recommendation module 160 to provide a recommendation for a new financial account that the user of multi-use account system may apply for. For example, the recommendation may be based on a user behavior metric obtained from optimization module 130 or database 180. After applying for a new financial account, enrollment module 110 may approve the application at step 510. In some embodiments, enrollment module 110 may communicate with financial data system 109 to obtain approval of the request to apply for the new account at step 508. If the application is not approved, the process may end at step 512 and a message may be displayed on the user interface indicating that the application was not approved.

At step 514, server system 105 is configured to add the financial account resulting from step 506 or step 508 to the user's multi-use account. For example, enrollment module 110 may communicate with financial data system 109 to provide access and/or retrieve financial data related to the financial account. The financial data can include information such as the issuing financial institution, card holder name, card holder address, account balance, available credit, existing fees, card expiration dates, and account transaction data (e.g., transaction dates, transaction amounts, transaction types, location of transaction, etc.), an annual percentage rate, rewards program information, a benefit associated with the financial account (e.g., automobile insurance, price protection for purchases of goods/services, etc.), a threshold requirement or rule to fulfill a status associated with the financial account, and a threshold requirement or rule to fulfill a rewards program associated with the financial account. In some aspects, enrollment module 110 allows the user to add multiple financial accounts (e.g. through steps 506 or 508) to the multi-use account. The financial data associated with each financial account in the multi-use account may be stored in memory 150b, database 180, and/or client device 190.

At step 516, server system 105 is configured to receive user preferences associated with the multi-use account. In some embodiments, enrollment module 110 provides instructions to a user interface on the client device 190 to enter user preferences. For example, the instructions may include a survey requesting input from the user. The user preferences may include user interests (e.g., travelling, sports, eat at restaurants, watching movies, etc.), transaction category preferences (e.g., sports, entertainment, food, etc.), and reward accumulation goals (e.g., in relation to rewards programs).

In some aspects, the user preferences may include weights associated with any of the financial data associated with each financial account in the multi-use account. The weights indicate a level of importance or preference to the user with respect to categories associated with the financial data. The user may adjust the weights for each category to suit the user's preferences or goals. For example, the user may increase the weight (to indicate a higher importance or preference) for a category related to a rewards program, a threshold requirement or rule to fulfill a status associated with the financial account, or a threshold requirement or rule to fulfill a rewards program associated with the financial account. The user may decrease the weight (to indicate a lower importance or preference) for a category related to available credit or existing fees. In some embodiments, enrollment module 110 communicates with optimization module 130 to obtain default weights for each category associated with the financial data. In some embodiments, enrollment module 110 communicates with optimization module 130 to automatically adjust the weights according to the user's behavior. For example, the weights may be adjusted based on preferences determined from a calculated user behavior metric associated with the multi-use account. The user behavior metric may indicate one or more of user spending patterns, user spending preferences, user category preferences, or user reward preferences. In some aspects, the weights applied to each category are used by optimization module 130 to select an optimal financial account from a plurality of financial accounts associated with the user's multi-use account during a transaction at a merchant, consistent with disclosed embodiments.

In some aspects, the user may, via the user interface, selectively control access to the financial accounts associated with the users multi-use account. For example, the user may temporarily disable or freeze certain financial accounts for a period of time. Alternatively, the user may selectively include spending thresholds on particular financial accounts. In some aspects, the user may provide permission for additional users to access the user's multi-use account. For example, the user (i.e. the primary user) may provide permission for additional family members (i.e. the secondary users), such as a spouse or child, to access the multi-use account. The secondary users may receive a physical account card or virtual account card that includes the same single account number as the primary user's account. Alternatively, the secondary users may receive an account card that includes a different account number that specifically designates the secondary users as non-primary users. The primary user may further customize the multi-use account to control secondary user's access to specific financial accounts associated with the primary user's multi-use account. For example, the primary user's multi-use account may include a first, second, and third financial account. The primary user may then provide permission for a first and second secondary user to access the multi-use account. The primary user may provide permission for the first secondary user to access only the first and second financial accounts when using the multi-use account. The primary user may further set additional limitations on usage of those first and second financial accounts, such as specific spending thresholds. The primary user may also provide permission for the second secondary user to access only the third financial account when using the multi-use account. In this manner, the primary user is able to selectively configure and customize control for the multi-use account to additional users.

Figure 6:
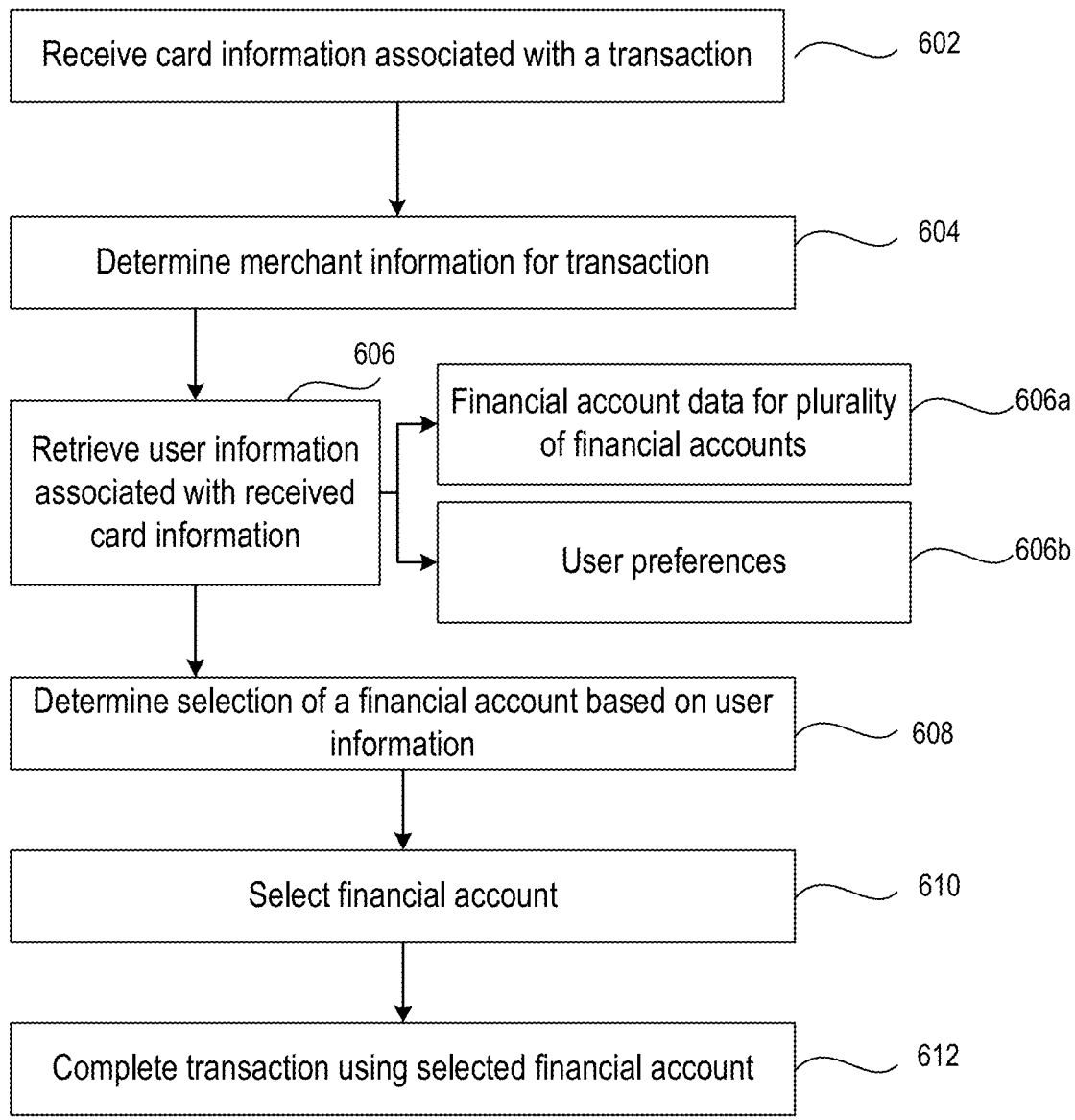
FIG. 6 is a flowchart of an exemplary method for optimizing the selection of a financial account during a transaction.

FIG. 6 is a flowchart of an exemplary method for optimizing the selection of a financial account during a transaction, consistent with embodiments of the present disclosure. In some embodiments, method 600 is implemented by server system 105. At step 602, server system 105 receives card information associated with a transaction at a merchant. For example, a user may conduct a financial transaction to purchase goods or services at a merchant, such as merchant system 107. In some embodiments, the transaction occurs at a POS terminal at merchant system 107. In some embodiments, the transaction is routed to merchant system 107 via an e-commerce website enabling the purchase of goods and/or services. The user may conduct the transaction using a card, such as card 402. The transaction may be conducted using a virtual card and/or via a client device 190 of the user, as disclosed with respect to FIG. 4.

At step 604, server system 105 is configured to determine merchant information for the financial transaction. For example, merchant information may include a date, time, amount, or geographic location of the transaction, a Merchant Category Code (MCC), name, address, or other descriptive information associated with the merchant. In some embodiments, the user may conduct the transaction via client device 190. Server system 105 may determine the geographic location of the client device at the time of the transaction using location determination system 140, for example. In some embodiments, server system 105 may determine the geographic location of the merchant system 107 at the time of the transaction using location determination system 140.

At step 606, server system 105 may be configured to retrieve user information associated with the received card information. For example, the card data may include information identifying the cardholder, an account number, and/or an expiration date. The card data may be used to access the user's multi-use account and retrieve user information, including financial account data for one or more financial accounts and user preferences associated with the multi-use account. The user information may be retrieved from database 180, memory 150b, or client device 190. In some aspects the user information may include financial account data 606a such as the financial account data for each account associated with the multi-use account. Financial account data 606a may include, for example, rewards program information, a credit limit, a fee, an annual percentage rate, a benefit associated with the financial account, a threshold requirement or rule to fulfill a status associated with the financial account, and a threshold requirement or rule to fulfill a rewards program associated with the financial account. User information may also include user preferences 606b, such as weights associated with the one or more categories of financial account data 606a. For example, the weights may indicate a level of importance or preference to the user. User preferences may further include one or more of user interests, transaction category preferences, and reward accumulation goals. In some embodiments, user preferences 606b may also include a calculated user behavior metric, consistent with disclosed embodiments.

At step 608, server system 105 may be configured to determine a selection of a preferred financial account from the plurality of financial accounts associated with the multi-use account based on the user information and the merchant information. For example, optimization module 130 may analyze the user information and merchant information using an optimization algorithm to determine which financial account to use for completing the transaction (as disclosed in further detail with respect to FIG. 8). For example, based on the determined merchant information at step 604, the user preferences 606b, and the financial account data 606a, optimization module 130 may determine that a first financial account (e.g., Financial Account #1 of FIG. 3) would provide the maximum accumulation of reward points relating to the category of the goods or services purchased. In some embodiments, optimization algorithm may determine the optimal financial account to use for the transaction based on a range of factors, including geographic location information association with the client device 190 and/or merchant system 107 at the time of the transaction, and a calculated user behavior metric, as disclosed in further detail with respect to FIG. 8.

At step 610, server system 105 may be configured to select the financial account based on the determination of step 608. For example, optimization module 130 may select the first financial account (e.g., Financial Account #1 of FIG. 3) to complete the transaction at the merchant system 107. In some aspects, the selection may be automatic. In some aspects, the selection may be displayed in a message to the user via a user interface of client device 190. The message may prompt the user to confirm the selection, and may require the user to provide a security feature to proceed. The security feature may include a passcode or biometric feature of the user (discussed in further detail with respect to FIG. 2). In some aspects, optimization module 130 may be configured to display two or more financial accounts in a message to the user via the user interface of client device 190. The message may include a summary explaining why the particular financial account was selected. For example, the message may recite "Paying with Financial Account #1 will provide 100 rewards points towards your balance."

In some embodiments, optimization module 130 provides the opportunity for a user of the multi-use account to maximize an accumulation of rewards for each transaction. For example, user preferences 606b may indicate a preference for accumulating rewards for a rewards program. The user may adjust the weight for this factor to indicate the preference, consistent with disclosed embodiments. The user preferences 606b may indicate a particular goal tied to a rewards program. For example, the user may provide a goal of accumulating a certain number of miles for a vacation. The user may provide more than one goal, and indicate a preference between them. For example, the user may provide a first goal of accumulating a certain number of miles for a vacation and a second goal of receiving a certain amount of cash back. The user may place a preference on the first goal over the second goal, so that optimization module 130 may automatically maximize the rewards accumulated during a transaction based on the user's preferences.

At step 612, server system 105 may be configured to complete the transaction using the selected financial account. For example, server system 105 may communicate with financial data system 109 or merchant system 107 to request authorization to complete the transaction. In some aspects, to complete the transaction financial data system 109 or merchant system 107 may send an authentication request to server system 105. For example, the authentication request may be relate to security features for the selected financial account. Server system 105 may retrieve security information related to the authentication request from database 180 or alternatively retrieved from a smart chip 404 (or smart chip data stored as part of a virtual card). Server system 105 may utilize the retrieved security information (for example, via authentication module 120) to provide a suitable response to the authentication request. For example, server system 105 my generate a token containing the security information in response to the authentication request.

Figure 7:
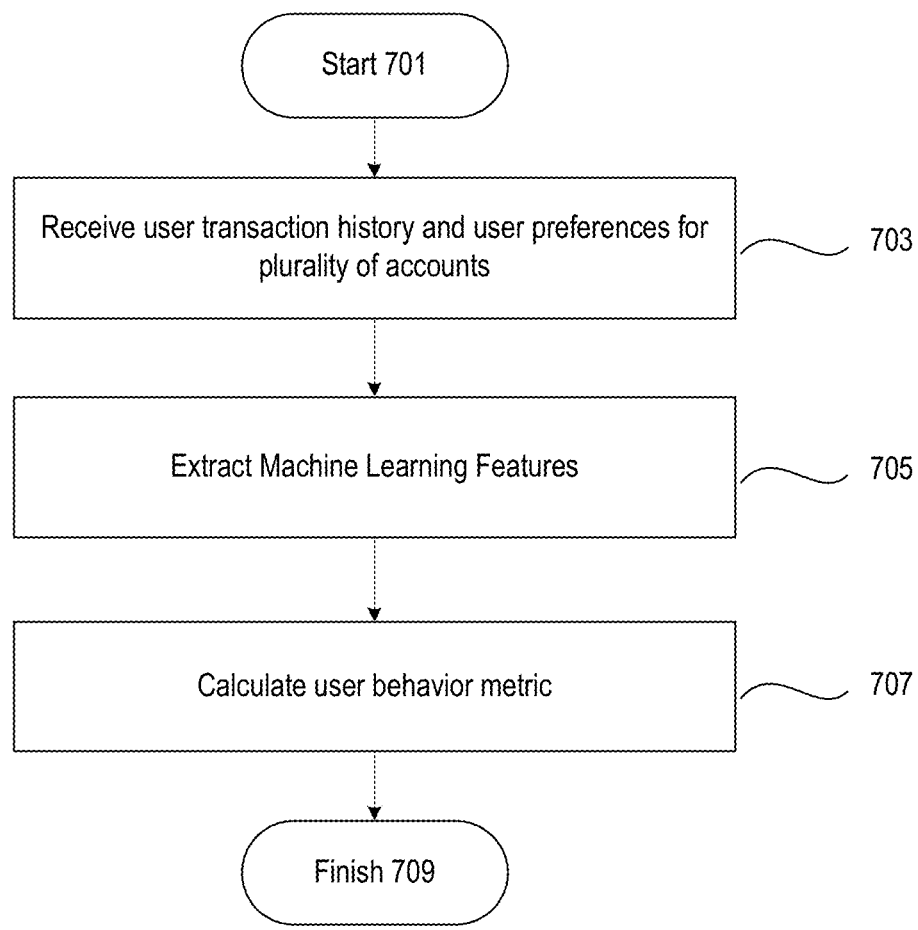
FIG. 7 is a flowchart of an exemplary method for using a machine learning processor to calculate a user behavior metric.

FIG. 7 is a flowchart of an exemplary method for using a machine learning processor to calculate a user behavior metric. In some embodiments, method 700 may be implemented by optimization module 130 on server system 105. After starting at step 701, optimization module 130 may be configured to receive user transaction history for the financial accounts associated with multi-use account and user preferences associated with the multi-use account at step 703. For example, optimization module 130 may retrieve user transaction history for the financial accounts associated with the user's multi-use account from database 180, memory 150b, or financial data system 109.

At step 705, optimization module 130 may be configured to extract machine learning features from the user transaction history and user preferences, consistent with embodiments of the present disclosure. In some embodiments, these features can be extracted by inputting the user transaction history and user preferences data into a first convolutional neural network. The first convolutional neural network can be configured to output the machine learning features. Optimization module 130 can extract user behavior attributes from the machine learning features. In some embodiments, these features can be extracted by inputting the machine learning features into a classifier, such as a second convolutional neural network. In some embodiments, the second convolutional neural network can be distinct from the first convolutional neural network. The second convolutional neural network can be configured to output indications of the user behavior attributes. In step 707, optimization module 130 can be configured to calculate a metric, such as a user behavior metric, based on the extracted machine learning features. A value of the user behavior metric can indicate one or more of user spending patterns, user spending preferences, user category preferences, or user reward preferences. After step 707, method 700 can end at step 709.

Figure 8:
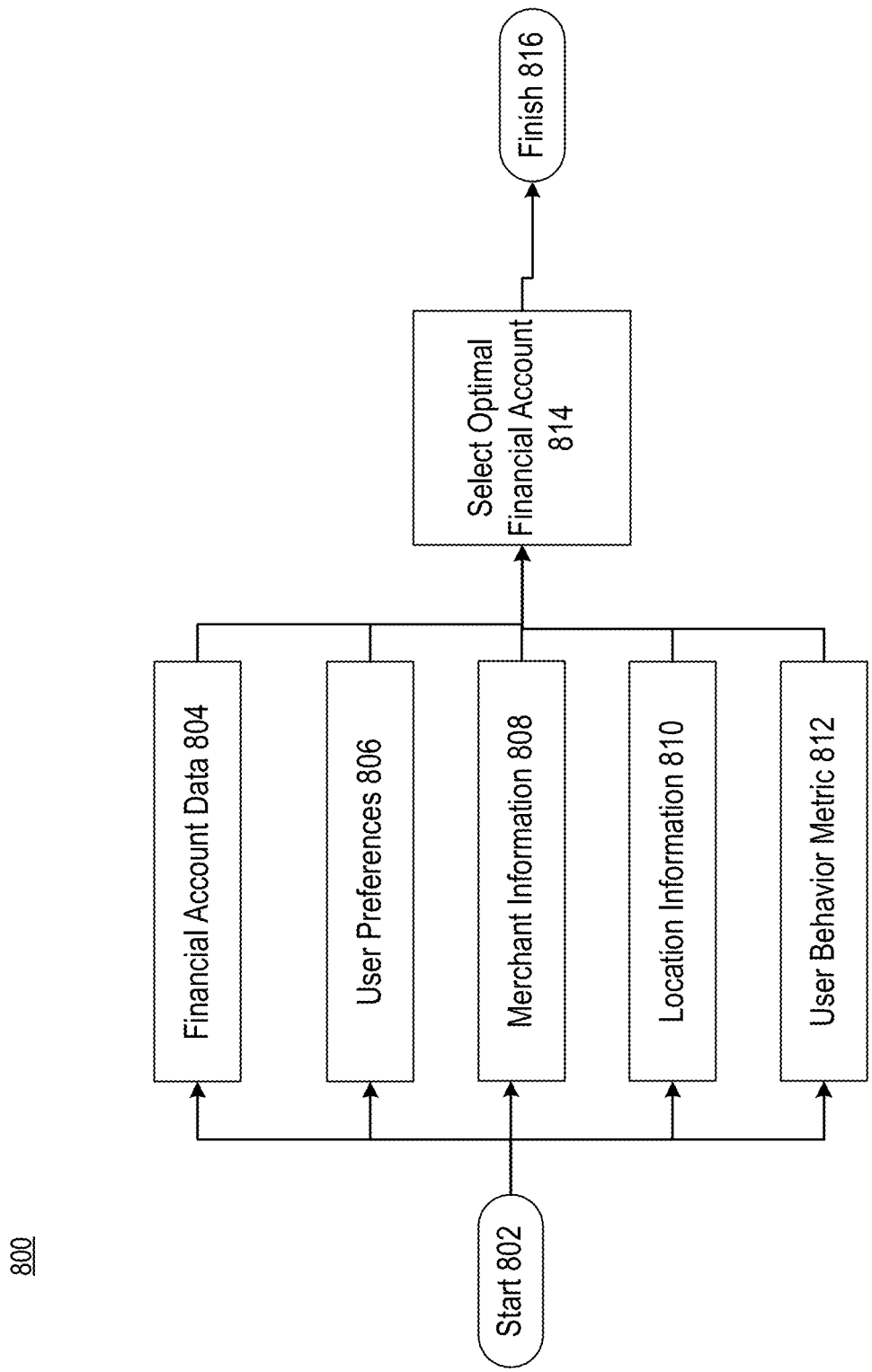
FIG. 8 is a flowchart of an exemplary method for selecting an optimal financial account based on one or more factors.

FIG. 8 is a flowchart of an exemplary method for selecting an optimal financial account based on one or more factors, consistent with embodiments of the present disclosure. In some embodiments, method 800 is implemented by optimization module 130 on server system 105. Method 800 begins at step 802 to select the preferred or optimal financial account to complete a transaction at a merchant. In some embodiments, method 800 may be implemented using an optimization algorithm. For example, the optimization algorithm may process one or more factors to select the optimal financial account at step 814. In some embodiments, the factors may include financial account data 804, user preferences 806, merchant information 808, location information 810, and user behavior metric 812. In some embodiments, the factors are weighted to select the optimal financial account at step 814.

In some embodiments, financial account data 804 may be obtained from database 180, memory 150b, or financial data system 109. Financial account data 804 includes the financial account data for each account associated with the user's multi-use account, as discussed above with respect to FIG. 6. Financial account data 804 may include, for example, the issuing financial institution, card holder name, card holder address, account balance, available credit, existing fees, card expiration dates, and account transaction data (e.g., transaction dates, transaction amounts, transaction types, location of transaction, etc.), an annual percentage rate, rewards program information, a benefit associated with the financial account (e.g., automobile insurance, price protection for purchases of goods/services, etc.), a threshold requirement or rule to fulfill a status associated with the financial account (e.g., a certain number of airline miles travelled to maintain a "gold" status), and a threshold requirement or rule to fulfill a rewards program associated with the financial account.

In some embodiments, user preferences 806 may be obtained from database 180, memory 150b, or client device 190. User preferences 806 include weights associated with the categories of financial account data 804, as discussed above with respect to FIG. 6. For example, the weights may indicate a level of importance or preference to the user for each category of financial account data 804. User preferences may further include one or more of user interests (e.g., travelling, sports, eat at restaurants, watching movies, etc.), transaction category preferences (e.g., sports, entertainment, food, etc.), and reward accumulation goals (e.g., in relation to rewards programs). User preferences may include information regarding client device 190, such as a unique device identifier, a make, and/or a model of the device.

In some embodiments, merchant information 808 can be obtained from merchant system 107, as disclosed in FIG. 6 above. Merchant information may include a date, time, amount, or geographic location of the transaction, a Merchant Category Code (MCC), name, address, a geographic location of the merchant, or other descriptive information associated with the merchant.

In some embodiments, location information 810 includes geographic location information obtained from location determination system 140, merchant system 107, and/or client device 190, as disclosed in FIG. 1 above. For example, location information 810 may include the geographic location of the user's client device 190 at the time of the transaction, or the geographic location of the merchant system 107 at the time of the transaction.

In some embodiments, user behavior metric 812 may be retrieved from database 180, memory 150b, or client device 190. User behavior metric 812 may be calculated as disclosed above with respect to FIG. 7. User behavior metric 812 may indicate one or more of user spending patterns, user spending preferences, user category preferences, or user reward preferences.

At step 814, optimization module 130 uses an optimization algorithm to calculate a selection or recommendation of the optimal financial account, from the plurality of financial accounts associated with the user's multi-use account, to use for a transaction at a merchant. The optimization algorithm may process factors to select or recommend the optimal financial account at step 814, including one or more of financial account data 804, user preferences 806, merchant information 808, location information 810, or user behavior metric 812 in step 814. In some aspects, the factors are weighted to select or recommend the optimal financial account. The weights indicate a level of importance or preference to the user with respect to the factors, and may be similar to the weights discussed above with respect to FIG. 5. For example, the user may adjust the weights for each category to suit the user's preferences or goals. As another example, the weights may be adjusted automatically based on default values or based on preferences determined from the user behavior metric 812 associated with the multi-use account. Method 800 ends at step 816.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An account system for optimizing transactions for a user, the system comprising:
   at least one processor; and
   a storage medium storing instructions that, when executed, configure the at least one processor to perform operations comprising:
      receiving, from the user at a user interface, account information associated with a first financial account of a plurality of financial accounts, wherein the plurality of financial accounts is associated with the user;
      storing the received account information in a database storing user information, the user information comprising financial account data of the plurality of financial accounts associated with the user;
      receiving card information during a transaction at a merchant system, wherein the card information includes a single account number associated with the plurality of financial accounts;
      receiving, from the merchant system, merchant information for the transaction;
      retrieving, based on the account number, a database record from the database, the database record comprising the plurality of financial accounts associated with the user, user transaction history for at least one of the plurality of financial accounts, and user preferences;
      calculating, using a machine learning algorithm, a user behavior metric associated with the user, wherein the calculating includes:
         extracting features indicative of characteristics of the user's behavior from the user transaction history and user preferences using a first convolutional neural network;
         determining user behavior attributes from the extracted features using a second convolutional neural network; and
         calculating the user behavior metric based on the user behavior attributes;
      determining, using an optimization algorithm, a preferred financial account from the plurality of financial accounts based on the financial account data, the user behavior metric, the user preferences, and the merchant information; and
      selecting, based on the determination, the preferred financial account to complete the transaction.

2. The system of claim 1, wherein the user interface enables adding a financial account to the plurality of financial accounts.

3. The system of claim 1, wherein the user interface enables temporarily disabling a financial account of the plurality of financial accounts.

4. The system of claim 1, wherein the user interface enables removing a financial account from the plurality of financial accounts.

5. The system of claim 1, wherein the user interface enables providing an access to the plurality of financial accounts for additional users.

6. The system of claim 5, wherein the provided access is limited.

7. The system of claim 1, wherein the user interface enables including a threshold on a financial account of the plurality of financial accounts.

8. The system of claim 1, wherein the account information comprises one or more of a name of the user, an account number, or a passcode.

9. The system of claim 1, wherein the financial account data comprises one or more factors, the factors comprising of rewards program information, a credit limit, a fee, an annual percentage rate, a benefit associated with the financial account, a threshold requirement to fulfill a status associated with the financial account, and a threshold requirement to fulfill a rewards program associated with the financial account.

10. The system of claim 9, wherein the user preferences comprise weights associated with the factors, the weights indicating a level of importance to the user.

11. The system of claim 1, wherein the user preferences comprise one or more of user interests, transaction category preferences, and reward accumulation goals.

12. The system of claim 1, wherein the user behavior metric indicates one or more of user spending patterns, user spending preferences, user category preferences, or user reward preferences.

13. The system of claim 1, wherein the user information further comprises the user behavior metric.

14. The system of claim 1, wherein the operations further comprise generating a recommendation for an additional financial account based on the user behavior metric.

15. The system of claim 1, wherein the operations further comprise:
   determining a geographic location of a mobile device at the time of the transaction; and
   wherein determining a preferred financial account from the plurality of financial accounts is further based on the determined location.

16. The system of claim 1, wherein the merchant information comprises one or more of a date, a time, or a location of the transaction.

17. A computer-implemented method for optimizing transactions for a user, the method comprising:
   receiving, from the user at a user interface, account information associated with a first financial account of a plurality of financial accounts, wherein the plurality of financial accounts is associated with the user;
   storing the received account information in a database storing user information, the user information comprising financial account data of the plurality of financial accounts associated with the user;
   receiving card information during a transaction at a merchant system, wherein the card information includes a single account number associated with the plurality of financial accounts;
   receiving, from the merchant system, merchant information for the transaction;
   retrieving, based on the account number, a database record from the database, the database record comprising the plurality of financial accounts associated with the user, user transaction history for at least one of the plurality of financial accounts, and user preferences;
   calculating, using a machine learning algorithm, a user behavior metric associated with the user, wherein the calculating includes:
      extracting features indicative of characteristics of the user's behavior from the user transaction history and user preferences using a first convolutional neural network;
      determining user behavior attributes from the extracted features using a second convolutional neural network; and
      calculating the user behavior metric based on the user behavior attributes;

determining, using an optimization algorithm, a preferred financial account from the plurality of financial accounts based on the financial account data, the user behavior metric, the user preferences, and the merchant information; and selecting, based on the determination, the preferred financial account to complete the transaction.

18. A non-transitory computer-readable medium storing instructions that, when executed by at least one processor, cause the at least one processor to operate an account system for optimizing transactions for a user, comprising:

receiving, from the user at a user interface, account information associated with a first financial account of a plurality of financial accounts, wherein the plurality of financial accounts is associated with the user;

storing the received account information in a database storing user information, the user information comprising financial account data of the plurality of financial accounts associated with the user;

receiving card information during a transaction at a merchant system, wherein the card information includes a single account number associated with the plurality of financial accounts;

receiving, from the merchant system, merchant information for the transaction;

retrieving, based on the account number, a database record from the database, the database record comprising the plurality of financial accounts associated with the user, user transaction history for at least one of the plurality of financial accounts, and user preferences;

calculating, using a machine learning algorithm, a user behavior metric associated with the user, wherein the calculating includes:

extracting features indicative of characteristics of the user's behavior from the user transaction history and user preferences using a first convolutional neural network;

determining user behavior attributes from the extracted features using a second convolutional neural network; and calculating the user behavior metric based on the user behavior attributes;

determining, using an optimization algorithm, a preferred financial account from the plurality of financial accounts based on the financial account data, the user behavior metric, the user preferences, and the merchant information; and selecting, based on the determination, the preferred financial account to complete the transaction.

\* \* \* \* \*